Sept. 29, 1970  FUKUO SHIBATA  3,531,701
ELECTRIC CONTROL SYSTEM FOR INDUCTION MACHINE CONTAINING
WINDING ELEMENTS OF TWO WOUND ROTOR INDUCTION MACHINES
Filed March 14, 1967

Inventor Fukuo Shibata

United States Patent Office 3,531,701
Patented Sept. 29, 1970

3,531,701
ELECTRIC CONTROL SYSTEM FOR INDUCTION MACHINE CONTAINING WINDING ELEMENTS OF TWO WOUND ROTOR INDUCTION MACHINES
Fukuo Shibata, 13 Tokiwa-cho, Hyogo Prefecture, Nishinomiya, Japan
Filed Mar. 14, 1967, Ser. No. 624,119
Claims priority, application Japan, Mar. 14, 1966, 41/16,008; Mar. 31, 1966, 41/20,320
Int. Cl. H02p 7/60
U.S. Cl. 318—45
12 Claims

ABSTRACT OF THE DISCLOSURE

Heretofore, there has been a famous method, called Scherbius, for controlling a wound rotor induction machine by an inverter composed of controlled rectifiers and a transformer which are electrically connected with the secondary circuit of the induction machine through a converter such as a diode rectifier. The above transformer is electrically connected with an alternating current bus with which the primary winding of the induction machine is connected electrically.

In an induction machine arrangement which contains two stator and two rotor windings rotating mechanically together with each other, controlled rectifiers are connected electrically between terminals of the two rotor windings; an alternating current bus electrically connected respectively with the two stator windings; further a phase shift control device and a firing circuit are electrically connected between the said bus and the control electrode of the said rectifiers; whereby a control system is obtained of a wide speed range when operating as a motor and a constant frequency control system when operating as a generator.

---

This invention relates to electric control systems for induction machines. An induction machine is an asynchronous alternating current machine which comprises a magnetic circuit interlinked with two electric circuits, or sets of circuits, rotating with respect to each other and in which power is transferred from one circuit to another by electro-magnetic induction. Examples of induction machines are induction motors, induction generators, electric couplings, and certain types of frequency converters and phase converters.

More particularly, the invention is concerned with the control system of speed for induction machines, such as induction motors, electric couplings, over a wide range by employing rectifiers. Further, the invention is concerned with the control system for an induction machine operating as a generator by employing rectifiers.

In the control of induction machines by rectifiers it is important to provide control systems by which the induction machines can be controlled as motors over wide speed ranges without sacrificing efficiency of operation, torque or economy of apparatus of the systems.

Heretofore, various arrangements have been devised which permit the control of induction motors by employing rectifiers which are electrically connected with the rotor or secondary windings of the induction motors. In general, the electric power taken from the rotor or secondary windings is either fed back to the A.C. source or fed to the main shaft of the induction motors. When it is fed back to the A.C. source, in the prior arrangements, torque or efficiency of operation is not so large in case of comparatively low speed control range, because a large part of the electric energy supplied on the input terminals of the induction motor is fed back to the A.C. source and is not converted into the mechanical torque. When the electric power taken from the rotor is fed to the main shaft of the induction motor by using a direct current motor in the prior method, the efficiency of operation, or economy of apparatus of the system is rather reduced.

It is one of the objects of this invention to provide a speed control system by which the induction machine can be controlled when acting as a motor over a wide speed range without sacrificing efficiency of operation, torque or economy of apparatus of this system.

In the control of induction machines it is important to provide control systems by which the induction machines can be controlled as brushless type motors or generators. It is another object of this invention to make a brushless type controllable induction machine acting as a motor or a generator.

In the control of frequencies of generators it is important to keep constant frequencies of generators which are driven by prime movers at speeds not always constant. So, it is further another object of this invention to provide a simple control system keeping a constant frequency of a generator which is driven by a prime mover at speed not always constant.

This invention possesses many other advantages, and has other objects which may be made more clearly apparent from a consideration of several embodiments of this invention. For this purpose, there are shown a few forms in the drawings accompanying and formed part of the present specification. These forms will now be described in detail, illustrating the general principles of the invention, but it is to be understood that this detailed description is not to be taken in a limiting sense, since the scope of the invention is best defined by the appended claims.

Referring to the drawings.

The machine arrangement according to the invention comprises the following combination: two alternating current electric windings called a first winding and a second winding which are coupled electromagnetically with respect to each other and rotating with respect to each other; other two alternating current electric windings called a third winding and a fourth winding which are coupled electromagnetically with respect to each other and rotating with respect to each other; controlled rectifiers which have each gate or control electrode respectively and are inserted and connected electrically between terminals of the said second winding and terminals of the said fourth winding; means for rotating mechanically the said second winding together with the said fourth winding; an alternating current bus which is electrically connected respectively with the first winding and with the third winding; wherein a phase shift control device and a firing circuit for the said controlled rectifiers are electrically connected between the said alternating current bus and the said each gate or control electrode of the controlled rectifiers.

Figure 1:
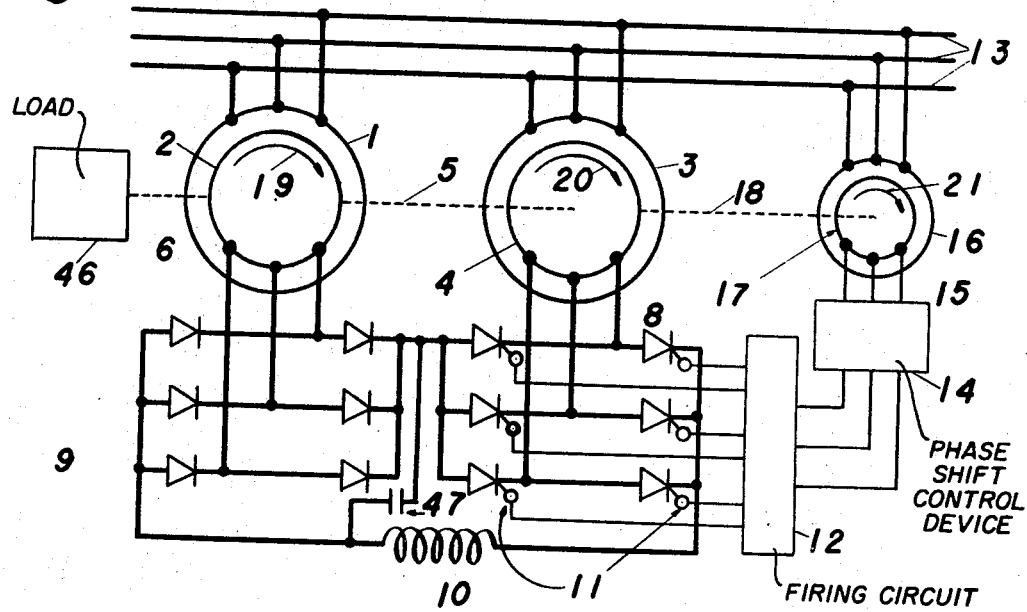
FIG. 1 illustrates diagrammatically one embodiment of my invention.

In FIG. 1, two electric windings coupled electromagnetically with respect to each other are shown. These are: a first winding 1 and a second winding 2. These two windings 1 and 2 are coupled electromagnetically with respect to each other, and are arranged for rotating with respect to each other. Further, other two electric windings are shown in FIG. 1. These are: a third winding 3 and a fourth winding 4. These two windings 3 and 4 are also coupled electromagnetically with respect to each other, and are arranged for rotating with respect to each other. A dotted line 5 shows that the second winding 2 rotates mechanically together with the fourth winding 4. That is; the rotor including the second winding 2 is mechanically coupled with the rotor including the fourth winding 4. The phrase "to couple mechanically" is herein defined as to connect the members so that the mechanical torque or power can be transferred between the members either with or without slip, for instance, by direct coupling (with bolt, pin, etc.) rubber coupling device, belt, gear, or chain. We can consider an example of mechanical coupling between the rotor including the second winding 2 and the rotor including the fourth winding 4 as follows:

There are two induction machines 6 and 7 whose stationary windings are the first and the third windings (1 and 3) respectively and whose rotor windings are the second and the fourth windings (2 and 4) respectively: these rotors containing respectively the second winding 2 and the fourth winding 4 are coupled mechanically with each other, for instance by a direct coupling (with bolt, pin, etc.) with gear, or chain.

In all these cases, the second winding 2 rotates mechanically together with the fourth winding 4. Controlled rectifiers 8 are connected electrically between the terminals of the second winding 2 and the terminals of the fourth winding 4. In FIG. 1, a rectifying device 9 is further provided and is connected electrically between the terminals of the second winding 2 and the controlled rectifiers 8 in order to obtain direct current. Therefore, the controlled rectifiers 8 are connected electrically between the direct current terminals of the rectifying device 9 and the fourth winding 4. A reactor 10 is connected between a direct current terminal of the rectifying device 9 and a terminal of the controlled rectifiers 8. Each control electrode or gate 11 of the controlled rectifiers 8 is supplied with the control signal from the firing circuit 12 for controlling the power fed from the direct current output of the rectifying device 9 to the fourth winding 4. A group of diode rectifiers is shown in FIG. 1 as an example of a rectifying device 9. In many cases, semiconductor rectifiers are used as diode rectifiers and as controlled rectifiers 8.

In FIG. 1, the terminals of the first winding 1 are connected electrically with the terminals of the third winding 3. When the alternating current bus 13 is supplied from an alternating current source, the first winding 1 and the third winding 3 are supplied with an alternating current from the alternating current source. The firing circuit 12 of each gate 11 of the controlled rectifiers 8 is supplied with electric energy from the alternating current bus 13 through a phase shift control device 14 and an induction machine 15. This induction machine 15 consists of a stationary winding 16 and a rotor winding 17. Although the stationary winding 16 and a rotor winding 17 form an induction machine 15 in FIG. 1, it is not always necessary to construct an induction machine independent of other induction machine 6 or 7. In practice, we can generally say that there can be provided the fifth winding 16 and the sixth winding 17 in some embodiments of this invention. These two electric windings 16 and 17 are coupled electromagnetically with respect to each other and are arranged for rotating with respect to each other. The stationary fifth winding 16 is connected electrically with the alternating current bus 13. The rotary sixth winding 17 is connected electrically with the firing circuit 12 through the phase shift control device 14. The sixth winding 17 is mechanically coupled with the fourth winding 4. Therefore, the sixth winding 17 rotates together with the fourth winding 4. A dotted line 18 shows the mechanical coupling between the rotor of the fourth winding 4 and the sixth winding 17.

Thus it can be said in this invention that a phase shift control device 14 and a firing circuit 12 for the controlled rectifiers are electrically connected between the alternating current bus 13 and each gate or control electrode 11 of the controlled rectifiers 8, by considering that the electric circuit in which the two electric windings 16 and 17 electromagnetically coupled with each other are inserted is electrically continuously connected across the electromagnetically connected two windings.

When the alternating current bus 13 is supplied with electric energy from the alternating current source, the first winding 1, the third winding 3 and the fifth winding 16 are supplied with electric current from the alternating current bus 13. So, the rotating fields are produced in the stators and the rotors of these induction machines 6, 7 and 15. Arrows 19, 20 and 21 show examples of directions of the rotations of the rotating fields. We can arrange so that the direction 19 of the rotation of the rotating field made by alternating current flowing in the first polyphase winding 1 is opposite to the direction 20 of the rotation of the retaining field made by alternating current flowing in the third polyphase winding 3. The directions of the rotation of the rotors of the second winding 2, the fourth winding 4 and the sixth winding 17 are same with respect to each other.

In FIG. 1, a direct current taken from the output terminals of the rectifying device 9 is fed to the fourth winding 4 through the controlled rectifiers 8 and the reactor 10. Therefore, the controlled rectifiers 8 with the firing circuit 12, the phase shift control device 14 and the induction machine 15 operate as a separate excitation type inverter. The frequency of the control signal in the firing circuit (gate control circuit) 12 obtained from the alternating current bus 13 through the phase shift control device 14 and the induction machine 15 matches with the frequency of the current through the terminals of the fourth winding 4 or of the controlled rectifiers 8, because the sixth winding 17 rotates together with the forth winding 4 or the sixth winding 17 is arranged for coupling mechanically with the fourth winding 4, therefore the frequency of the voltage at the terminals of the sixth winding 17 is equal to that of the fourth winding 4. Thus the fourth winding 4 is supplied from the controled rectifiers 8 having the same output frequency as the fourth winding 4.

The fourth winding 4 rotates in the third winding 3 in the region $s(\text{slip}) > 1$, so that the fourth winding 4 revolves against the rotating field 20, when the direction 20 of the rotation of the rotating field made by alternating current flowing in the third polyphase winding 3 is opposite to the direction 19 of the rotation of the rotating field made by alternating current flowing in the first polyphase winding 1. In this case, the controlled rectifiers 8 work at a higher frequency than that of the alternating current bus 13. Part of the slip power supplied from the controlled rectifiers 8 to the fourth winding 4 is fed back to the alternating current bus 13. A part of the electric power supplied from the alternating current bus 13 to the first winding 1 is converted into the mechanical power of the rotor containing the second winding 2, and another part of the electric power supplied from the alternating current bus 13 to the first winding 1 is fed to the fourth winding 4 through the second winding 2, the rectifying device 9, the reactor 10 and the controlled rectifiers 8. Thus, the mechanical power of the rotor containing the fourth winding 4 can be added to the mechanical power of the rotor containing the second winding 2 when the induction machine set 6–7 operates as a motor. The mechanical power of the rotor containing the second winding 2 or that of the rotor containing the fourth winding 4 is converted from the electric power which is absorbed from the electric power flow between the first winding 1 to the third winding 3 through the second winding 2, the rectifying device 9, the controlled rectifiers 8 and the fourth winding 4. With mechanical and inverter power limitations, the device permits continuous speed control from zero to the maximum speed near to the synchronous speed of the second winding 2. The speed of the rotor of the second winding 2 rotating together with the fourth winding 4 can be controlled by the control of the phase shift control device 14.

In FIG. 1, the phase shift control device 14 is inserted between the sixth winding 17 and the firing circuit 12 of the controlled rectifiers 8. FIG. 1 also indicates that the direction 20 of the rotation of the rotating field made by alternating current flowing in the third polyphase winding 3 is the same as the direction 19 of the rotation of the rotating field made by alternating current flowing in the first polyphase winding 1. In FIG. 1, the fourth winding 4 rotates in the third winding 3 in the region $s$(slip)<1, so that the fourth winding 4 revolves in the same direction as the rotating field 20. Generally, the number of poles made by the first winding 1 must be the same as that made by the second winding 2, and the number of poles made by the third winding 3 must be the same as that made by the fourth winding 4.

When the first winding 1 is embedded in one stator and the third winding 3 is in the other stator, and further, the second winding 2 is embedded in one rotor and the fourth winding 4 is in the other rotor, if the direction 20 of the rotation of the rotating field made by alternating current flowing in the third polyphase winding 3 is opposite to the direction 19 of the rotation of the rotating field made by alternating current flowing in the first polyphase winding 1, the number of poles made by the first winding 1 may be the same as or different from that made by the third winding 3.

When the first winding 1 is embedded in one stator and the third winding 3 is in the other stator, and the second winding 2 is embedded in one rotor and the fourth winding is in the other rotor, if the direction 20 of the rotation of the rotating field made by alternating current flowing in the third polyphase winding 3 is the same as the direction 19 of the rotation of the rotating field made by alternating current flowing in the first polyphase winding 1, the number of poles made by the first winding 1 must be different from that made by the third winding 3.

Figure 2:
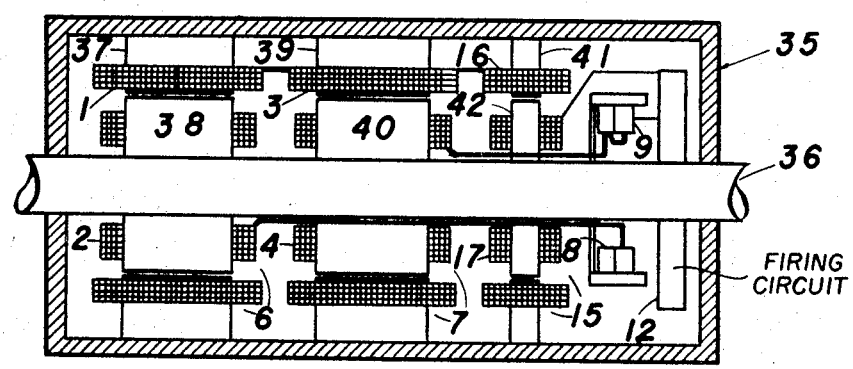
FIG. 2 is an example showing a construction according to this invention.

In FIG. 2, the first winding 1 is on the surface of one stator core 37, the third winding 3 is on the surface of another stator core 39, and the fifth winding 16 is on the surface of still another stator core 41. The second winding 2 is on the surface of one rotor core 38, the fourth winding 4 is on the surface of another rotor core 40, and the sixth winding 17 is on the surface of still another rotor core 42. In FIG. 12, these six kind of windings 1, 2, 3, 4, 16 and 17 are included in one case 35, and the three kind of windings 2, 4 and 17 are arranged for rotating around one shaft 36.

In FIG. 1, it is shown that the rectifying device 9, the reactor 10 and the controlled rectifiers 11 form a cycle changing part which is connected electrically between the second winding 2 and the fourth winding 4. This cycle changing part can be either stationary or rotary. If it is installed in a static position outside the rotary part, it is necessary to provide sliprings on the terminals of the second winding 2 and the fourth winding 4 for connecting these windings 2 and 4 with the cycle changing part. If the cycle changing part and the grid (or gate) control part containing the firing circuit 12 are arranged for rotating together with the second, the fourth and the sixth windings 2, 4, 17, it is not necessary to provide sliprings on the terminals of these windings 2, 4, 17, as shown in FIG. 2. In FIG. 2, the controlled rectifiers 8 are mechanically clamped or coupled with the rotor shaft 36 around which the controlled rectifiers 8 are mechanically driven together with the second, the fourth and the sixth windings 2, 4, 17.

Until now, we have mainly considered that induction machines containing the first, second, third and fourth windings in this invention can be driven as motors. However, the induction machines in this invention can be used also as induction generators. If the rotor containing the second winding 2 is driven at a speed more than its synchronous speed by a prime mover 46 which is shown as an example in FIG. 1, though the symbol 46 ordinarily shows the load, the induction machine 6 operates as an induction generator. In this case, the synchronous speed (r.p.m.) of the second winding 2 means the speed obtained from the following formula.

$$(\text{r.p.m.}) = \frac{f \times 120}{p}$$

where $p$ is the number of poles of the first or the second winding, and $f$ is frequency of the alternating current bus 13.

In this case, if the alternating current bus 13 is supplied with electric power from the other alternating current source, the exciting current of the induction machine 6 can be supplied from the alternating current source (not shown in the figure).

If there is no alternating current source other than induction machines 6, 7 and 15, the exciting current of the induction generator 6 can be supplied from the third winding 3 through the alternating current bus 13. Direct current electric energy will be stored in a condenser 47 connected between the second winding 2 and the fourth winding 4.

Ordinarily, the induction machine 7 is driven at a speed less than its synchronous speed, when the induction machine 6 operates as an induction generator. If the induction generator 6 is supplied with exciting current only from the induction machine 7, the frequency of the alternating current bus 13 can be controlled by the control of the phase shift control device 14.

The induction machine set shown in FIG. 2 can also be driven as an induction generator, which will be understood easily.

Finally, this invention is compared with the prior arrangements, as follows:

There is a prior arrangement for controlling speed of an induction motor, called Kramer system. In this prior arrangement, a direct current motor is connected electrically with a secondary winding of a wound rotor induction motor through a controlled rectifier.

The most important of this invention different from such prior arrangement is that a fourth winding of this invention which is connected electrically with a second winding through controlled rectifiers is not a direct current winding but an alternating current winding, further a third winding coupled electromagnetically with the fourth winding is also an alternating current winding. A commutator provided in a D.C. motor of the prior arrangement is not necessary in this invention.

There is another prior arrangement for controlling speed of an induction motor. In this prior arrangement, there is a first and a second electrodynamic system, each comprising a stator winding and a rotor winding, the rotatable parts of said first and second electrodynamic system being mechanically connected to each other, and two rectifier means each connected to one of said rotor windings for rectifying the current thereof, direct current bars and two inverter means each connected between said bars and one of said rotor windings. These stator windings and rotor windings in the first and second electrodynamic system of the prior arrangement correspond to the first, second, third and fourth windings of this invention. However, there are important difference between the prior arrangement and this invention, as follows:

In the arrangement of this invention, an alterating current bus 13 is electrically connected respectively with the first A.C. winding and with the third A.C. winding. In other words, the first A.C. winding 1 is connected electrically in parallel with the third A.C. winding 3 to the A.C. bus 13.

In an arrangement of the prior method, the first winding is connected electrically in parallel with the third winding to the A.C. bus. But the third winding is not A.C. winding but D.C. winding. In another arrangement of the prior method, both the first winding and the third winding are A.C. windings. But the first winding is connected electrically in series and not in parallel with the third winding toward the A.C. bus.

In the arrangement of this invention, a phase shift control device and a firing circuit for the controlled rectifiers are electrically connected between the alternating current bus and the control electrode of the controlled rectifiers. The speed of the machine is controlled by the phase shift control device in the arrangement of the invention. However, there is not such a phase shift control device in the arrangements of the prior method. The speed of the machine is controlled not by a phase shift control device but by the variable impedance element being connected to the stator winding in each arrangement of the prior method.

In the above arrangement of the prior method using the third A.C. winding, it is necessary to provide a large capacity of the variable impedance element in the circuit in parallel with the third A.C. winding. The available output power in the low speed range of the machine of the prior arrangement is less than that of this invention.

What I claim is:

1. Electric control system for induction machine arrangement comprising in combination: two alternating current electric windings called a first winding and a second winding which are coupled electromagnetically with respect to each other and rotating with respect to each other; other two alternating current electric windings called a third winding and a fourth winding which are coupled electromagnetically with respect to each other and rotating with respect to each other; controlled rectifiers which have each gate or control electrode respectively and are inserted and connected electrically between terminals of the said second winding and terminals of the said fourth winding; means for rotating mechanically the said second winding together with the said fourth winding; an alternating current bus which is electrically connected respectively with the first winding and with the third winding; wherein a phase shift control device and a firing circuit for the said controlled rectifiers are electrically connected between the said alternating current bus and the said each gate or control electrode of the controlled rectifiers.

2. The combination as set forth in claim 1, in which further two electric windings called fifth and sixth windings are coupled electromagnetically with respect to each other and rotating with respect to each other; the said fifth winding is connected electrically with the alternating current bus; the said sixth winding is connected for supplying a firing circuit of the controlled rectifiers with electric power; the said firing circuit is connected to each gate or control electrode of the controlled rectifiers; and means is provided for rotating mechanically the said sixth winding together with the said fourth winding.

3. The combination as set forth in claim 1, in which two induction machines are formed; one is formed by the first winding embedded in one stator and the second winding embedded in one rotor, and the other is formed by the third winding embedded in the other stator and the fourth winding embedded in the other rotor.

4. The combination as set forth in claim 1, in which the direction of the rotation of the rotating field made by alternating current flowing in the first polyphase winding is opposite to that of the rotating field made by alternating current flowing in the third polyphase winding.

5. The combination as set forth in claim 1, in which the direction of the rotation of the rotating field made by alternating current flowing in the first polyphase winding is same as that of the rotating field made by alternating current flowing in the third polyphase winding.

6. The combination as set forth in claim 1, in which the number of poles made by the first winding is the same as that made by the third winding.

7. The combination as set forth in claim 1, in which the number of poles made by the first winding is different from that made by the third winding.

8. The combination as set forth in claim 1, in which each phase of the second polyphase winding is connected with each phase of the fourth polyphase winding through the controlled rectifiers whose control electrode is supplied by the control signal for controlling the power fed from the second winding to the fourth winding.

9. The combination as set forth in claim 1, in which rectifying device is connected electrically between the terminals of the second winding and the controlled rectifiers in order to obtain a direct current therefor, the controlled rectifiers being connected electrically between the direct current terminals of the said rectifying device and the fourth winding, whereby each control electrode of the controlled rectifiers is supplied with the control signal from the firing circuit for controlling the power fed from the direct current output of the said rectifying device to the fourth winding.

10. The combination as set forth in claim 2, in which a phase shift control device is electrically connected between the sixth winding and the firing circuit of the controlled rectifiers.

11. The combination as set forth in claim 2, in which the controlled rectifiers are mechanically coupled or clamped with the rotor shaft around which the controlled rectifiers are mechanically driven together with the second, the fourth and the sixth windings.

12. The combination as set forth in claim 1, in which the rotor containing the second winding is mechanically coupled with the rotor containing the fourth winding by direct coupling with bolts, by gear coupling, belt, or chain coupling.

References Cited

UNITED STATES PATENTS

| | | | |
|---|---|---|---|
| 2,201,006 | 5/1940 | Kilgore | 318—197 XR |
| 2,355,727 | 8/1944 | Hölters | 318—197 XR |
| 3,327,189 | 6/1967 | Hedstrom | 318—237 XR |

ORIS L. RADER, Primary Examiner

G. Z. RUBINSON, Assistant Examiner

U.S. Cl. X.R.

318—197, 237